(12) United States Patent
Berckefeldt et al.

(10) Patent No.: US 10,338,337 B1
(45) Date of Patent: Jul. 2, 2019

(54) SYSTEM AND METHOD FOR DISPLAYING CRITICAL AERONAUTICAL INFORMATION ON AN UNCERTIFIED DISPLAY

(71) Applicant: HONEYWELL INTERNATIONAL INC., Morris Plains, NJ (US)

(72) Inventors: Richard Berckefeldt, Paola, KS (US); Willard R. True, Kirkland, WA (US); Kalluri R. Sarma, Mesa, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/915,503

(22) Filed: Mar. 8, 2018

Related U.S. Application Data (60) Provisional application No. 62/595,623, filed on Dec. 7, 2017.

(51) Int. Cl.
*H05K 5/00* (2006.01)
*G02B 7/00* (2006.01)
(Continued)

(52) U.S. Cl.
CPC ............ *G02B 7/005* (2013.01); *G02B 26/001* (2013.01); *G02B 27/0012* (2013.01); *G02B 27/0093* (2013.01)

(58) Field of Classification Search
CPC ....................................................... H05K 5/00
See application file for complete search history.

(56) References Cited

U.S. PATENT DOCUMENTS 7,025,274 B2   4/2006   Solomon et al.
7,139,644 B2   11/2006  Bernard et al.
(Continued)

FOREIGN PATENT DOCUMENTS

DE    102009046325 A1   5/2010
WO      2010045411 A1   4/2010

OTHER PUBLICATIONS

Miller, B., et al; Policy and Guidance for Electronic Flight Bag Class 1 & 2 System Architecture and Aircraft Connectivity; Federal Aviation Administration.
(Continued)

*Primary Examiner* — Jerry Wu
(74) *Attorney, Agent, or Firm* — Lorenz & Kopf, LLP (57) ABSTRACT

A display system configured for displaying critical aeronautical information on an aircraft display that is not certified for displaying critical aeronautical information comprises a mounting adapter and an application server. The mounting adapter is configured to mount, in an aircraft cockpit, a personal electronic device (PED) wherein the PED is not certified to display critical aeronautical information. The mounting adapter further comprises a surface with an actuatable covering that is configured to be overlaid on a PED display and an actuation source configured to actuate the covering. The application server is configured to execute a module that generates critical aeronautical information, transmit the generated critical aeronautical information to the PED for display, determine whether a problem exists with the image displayed on the PED display, and enable the actuation source to cause the covering to annunciate a message indicating a problem with the image displayed on the PED display.

20 Claims, 6 Drawing Sheets

(51) Int. Cl.
*G02B 27/00* (2006.01)
*G02B 26/00* (2006.01)

(56) References Cited

U.S. PATENT DOCUMENTS

| | | |
|---|---|---|
| 7,239,080 B2 | 7/2007 | Ng et al. |
| 8,803,772 B2 | 8/2014 | Kent et al. |
| 9,141,830 B2 | 9/2015 | Uczekaj et al. |
| 9,158,115 B1 | 10/2015 | Worley et al. |
| 9,337,953 B1 | 5/2016 | Raghu et al. |
| 9,341,843 B2 | 5/2016 | Border et al. |
| 9,583,008 B2 | 2/2017 | Marion et al. |
| 9,714,081 B1 | 7/2017 | Hall, III et al. |
| 2002/0039070 A1 | 4/2002 | Ververs |
| 2004/0155186 A1 | 8/2004 | Nestorovic et al. |
| 2006/0221022 A1 | 10/2006 | Hajjar |
| 2007/0281734 A1 | 12/2007 | Mizrachi |
| 2009/0058682 A1 | 3/2009 | True |
| 2010/0110657 A1 | 5/2010 | Weindorf |
| 2010/0214130 A1 | 8/2010 | Weinmann et al. |
| 2011/0063452 A1 | 3/2011 | Fifis et al. |
| 2012/0140125 A1 | 6/2012 | Pepitone et al. |
| 2013/0220841 A1 | 8/2013 | Yang |
| 2013/0305391 A1 | 11/2013 | Haukom et al. |
| 2013/0334545 A1 | 12/2013 | Hu et al. |
| 2014/0262847 A1 | 9/2014 | Yang |
| 2014/0264196 A1 | 9/2014 | Werner et al. |
| 2015/0029140 A1 | 1/2015 | Hwang et al. |
| 2015/0241765 A1 | 8/2015 | Hajjar et al. |
| 2016/0122036 A1 | 5/2016 | Hathaway |
| 2016/0349933 A1 * | 12/2016 | Owczarski ............ H04L 67/141 |
| 2017/0195647 A1 | 7/2017 | Honkanen et al. |
| 2017/0251501 A1 * | 8/2017 | Batsakes ................ H04L 67/12 |

OTHER PUBLICATIONS

USPTO Notice of Allowance for U.S. Appl. No. 15/920,155 dated Dec. 20, 2018.

* cited by examiner

SYSTEM AND METHOD FOR DISPLAYING CRITICAL AERONAUTICAL INFORMATION ON AN UNCERTIFIED DISPLAY

CROSS-REFERENCE TO RELATED APPLICATION

This application claims priority to U.S. Provisional Application No. 62/595,623 filed Dec. 7, 2017. This application incorporates the provisional application into the present application by reference.

TECHNICAL FIELD

The present disclosure generally relates to display systems, and more particularly relates to display systems for displaying critical information on uncertified displays.

BACKGROUND

In many safety critical and/or regulated industries, such as avionics, maritime, rail, medical devices, nuclear, and others, display systems that display mission critical information may need to be certified that they can provide adequate integrity, continuity, and availability (ICA) for the mission critical information to be displayed thereon. The certification process may be costly and time-consuming and, therefore, may deter the implementation of new applications, such as new applications that use personal electronic devices (PEDs) to display mission critical information.

In the avionics industry, low-cost PEDs, such as tablet computers and smartphones, are being used for non-critical applications, such as charts and maps applications and weight and balance calculators. Operators may also want to have the freedom to display aeronautical information, such as airport moving maps, air traffic (Cockpit Display of Traffic Information or CDTI), advanced weather radar information, and others, on tablet computers instead of having to make costly modifications and upgrades to their existing avionics displays. Long-standing regulatory policy prohibits the display of critical aeronautical information during flight on uncertified displays because adequate integrity, continuity, and availability (ICA) cannot be assured.

Accordingly, it is desirable to provide a certifiable system for displaying critical information on uncertified displays or displays not approved for the display of data requiring high ICA. Furthermore, other desirable features and characteristics will become apparent from the subsequent detailed description, taken in conjunction with the accompanying drawings and the foregoing technical field and background.

SUMMARY

Systems and method are provided for allowing the use of uncertified displays to display mission critical information. In one embodiment, a display system configured for displaying critical aeronautical information on an aircraft display that is not certified for displaying critical aeronautical information includes a mounting adapter configured to mount, in an aircraft cockpit, a personal electronic device (PED) having a PED display wherein the PED is not certified to display critical aeronautical information. The mounting adapter further includes a surface with an actuatable covering that is configured to be overlaid on the PED display and an actuation source configured to actuate the covering. The display system further includes an application server. The application server includes one or more processors and is configured to execute one or more modules that generate critical aeronautical information, transmit the generated critical aeronautical information to the PED for display on the PED display, determine whether a problem exists with the image displayed on the PED display, and enable the actuation source to cause the covering to annunciate a message indicating that a problem exists with the image displayed on the PED display.

In another embodiment, a computer-implemented method in an aircraft for displaying critical aeronautical information on an aircraft display that is not certified for displaying critical aeronautical information is provided. The method includes transmitting, by a computing device in the aircraft, critical aeronautical information to a personal electronic device (PED) mounted in an aircraft cockpit for display on a PED display of the PED, wherein the PED is not certified to display critical aeronautical information and wherein the PED display is overlaid with a surface having an actuatable covering on the surface. The method further includes determining, by the computing device, whether a problem exists with the image displayed on the PED display; and enabling, by the computing device, an actuation source to cause the covering to annunciate a message indicating that a problem exists with the image displayed on the PED display when it is determined that a problem exists.

In another embodiment, a display system configured for displaying critical aeronautical information on an aircraft display that is not certified for displaying critical aeronautical information includes a mounting adapter configured to mount, in an aircraft cockpit, a personal electronic device (PED) having a PED display wherein the PED is not certified to display critical aeronautical information. The mounting adapter includes a film configured to be overlaid on the PED display and that includes a coating that is optically active in the presence of an excitation source. The mounting adapter further includes an excitation source configured to activate the coating and a camera configured to take an image of the PED display. The display system further includes an application server mounted in the aircraft remotely from the aircraft cockpit wherein the application server includes one or more processors, is configured to execute one or more modules that generate critical aeronautical information, and configured to transmit the generated critical aeronautical information to the PED for display on the PED display. The application server is configured to monitor the integrity, continuity, and availability (ICA) of the generated critical aeronautical information displayed on the PED display using the camera image and to enable the excitation source to activate the coating when a loss of ICA of the generated critical aeronautical information displayed on the PED display is detected. Activation of the coating results in the annunciation of the loss of ICA on the film overlaid on the PED display.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. References to aeronautical and/or aviation specific terms such as but not limited to "cockpit", "flight deck", "certification", or "aircraft" are for simplifying the description and are not intended to limit the application and uses to the aviation or aeronautical industry. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Apparatus, systems, methods, techniques and articles are described for providing assurance that an uncertified display, such as a display on a personal electronic device (PED) (e.g., a tablet computer, a smartphone, or some other device), that is used to display mission critical data (e.g., critical aeronautical information) accurately conveys the mission critical data. The apparatus, systems, methods, techniques and articles described herein may provide assurances that an uncertified display accurately conveys mission critical data by verifying the integrity, continuity, and availability (ICA) of the mission critical data displayed on the uncertified display. Loss of accuracy or ICA can be annunciated to operators (e.g., a flight crew) of the uncertified display without reliance on the uncertified display to self-report the loss when displaying the mission critical data.

In the case of aeronautical applications, the apparatus, systems, methods, techniques and articles described herein may allow operators to use a PED to display critical aeronautical information. This may allow for a more affordable and quicker adoption of new avionics functionality. The described apparatus, systems, methods, techniques and articles may allow for mission critical data such as that generated by multiple high integrity applications (e.g. airborne situational awareness (AIRB) and various other CNS-ATM (Communications Navigation and Surveillance-Air Traffic Management) applications such as flight deck interval management (FIM) or air traffic control controller/pilot data link communication (CPDLC), SURF (Surface Surveillance application that includes an airport moving map with traffic superimposed), and others) to be displayed on uncertified displays. At the same time, the described apparatus, systems, methods, techniques and articles can allow data from lower integrity applications, such as maps and charts, to be displayed on the uncertified displays without changes to the applications or equipment installation.

Figure 1:
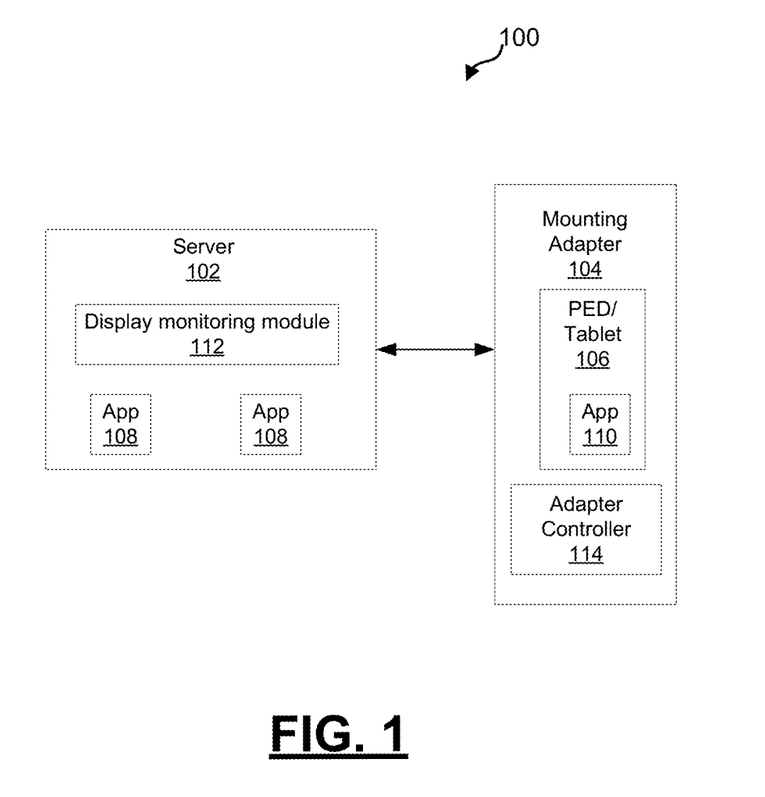
FIG. 1 is a block diagram depicting an example display system in an aircraft that allows uncertified display systems such as commercial PEDs to meet typical avionics requirements for the monitoring of ICA, in accordance with various embodiments.

FIG. 1 is a block diagram depicting an example system 100 that allows an uncertified display system, such as a PED, to meet typical avionics requirements for the monitoring of ICA. The example system 100 includes an application server 102 and a mounting adapter 104 configured to mount a PED 106 (having a PED display) in an aircraft flight deck or cockpit.

The example application server 102 includes at least one processor and a computer-readable storage device or media encoded with programming instructions for configuring the at least one processor. The example application server 102 is positioned in an aircraft remotely from the aircraft cockpit. The example application server 102 is a fully certified avionics box that hosts and executes one or more high integrity avionics application modules 108. The high integrity avionics application modules 108 are configured to generate mission critical data (e.g., critical aeronautical information) for display on a cockpit display. The example application server 102 is configured to transmit the generated critical aeronautical information to an uncertified cockpit display (e.g., the PED 106) for display (e.g., on the PED display).

The example application server 102 also includes a display monitoring module 112 that is configured to monitor the image displayed on an uncertified cockpit display when critical aeronautical information is transmitted from a high integrity avionics application module 108 to the uncertified cockpit display device (e.g., PED 106) to determine whether a problem exists with the display of the mission critical data on the uncertified display device. The example display monitoring module 112 is configured to determine whether a problem exists with the display of the mission critical data on the uncertified display device 106 by verifying the integrity, continuity, and availability (ICA) of the mission critical data displayed on the uncertified display device 106. The example display monitoring module 112 is also configured to cause the annunciation of a message indicating that a problem exists with the display of mission critical data on the uncertified display device 106, when it determines that a problem indeed exists.

The mounting adapter 104 is configured to mount an uncertified display device 106 in an aircraft cockpit for use by a flight crew so that the uncertified display device 106 may display critical or non-critical aeronautical information to the flight crew. When the uncertified display device 106 comprises a tablet computer, the mounting adapter 104 may include a clamshell shape to fully enclose the tablet computer 106.

The example uncertified display device 106 may comprise a PED (such as a tablet computer, a smartphone, or some other device), which includes at least one processor and computer readable media, and is configured to host and execute one or more application programs such as a specialized avionics display application 110. The example specialized avionics display application 110 is configured to display critical aeronautical information received by the PED 106 from the application server 102.

The example mounting adapter 104 further includes an adapter controller 114. The example controller 114 includes at least one processor and computer readable media. In other embodiments, the adapter controller 114 may not include a processor. The example controller 114 is configured (for example by programming instructions) to transmit images of the display on the uncertified display device 106 to the display monitoring module 112 and to activate the annunciation of a message indicating that a problem exists with the display of mission critical data on the uncertified display device 106, when the display monitoring module 112 determines that a problem exists.

Figure 2:
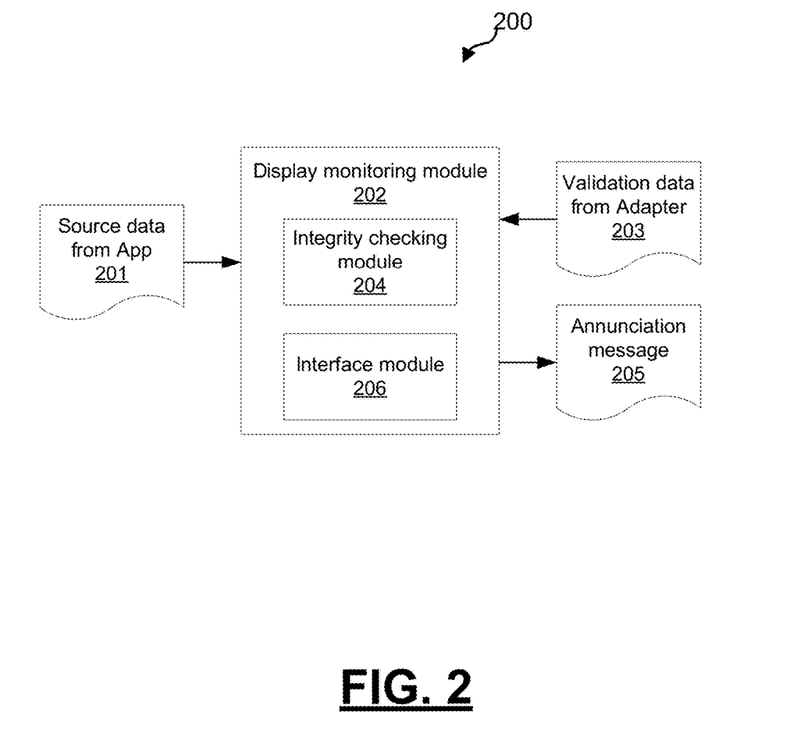
FIG. 2 is a block diagram depicting an example display monitoring module in an example server, in accordance with various embodiments.

FIG. 2 is a block diagram depicting an example display monitoring module 202 in a server 200 wherein the example display monitoring module provides a way to display critical aeronautical information on an aircraft display that is not certified for displaying critical aeronautical information. The example display monitoring module includes an integrity checking module 204 and an interface module 206. All or parts of the example display monitoring module may be incorporated in an application module (e.g., application module 108 from FIG. 1) or separate from the application module.

The integrity checking module 204 is configured to compare source data 201 (e.g., critical aeronautical information) received by the display monitoring module 202 from a high integrity avionics application (e.g., high integrity avionics application module 108 from FIG. 1) to validation data 203 (which includes image information from the PED display) received by the display monitoring module 202 from a monitoring adapter (e.g., mounting adapter 104 from FIG. 1). The integrity checking module 204 is configured to compare the source data 201 to the validation data 203 to determine whether a problem exists with the display of mission critical data on the uncertified display device (e.g., PED 106 from FIG. 1). The example integrity checking module 204 is configured to determine whether a problem exists with the display of mission critical data on the uncertified display device (e.g., PED 106) by verifying the ICA of the mission critical data displayed on the uncertified display device (e.g., PED 106).

The interface module 206 is configured to communicate an annunciation message 205 (e.g. a loss of ICA) to the mounting adapter (e.g., mounting adapter 104 from FIG. 1) that instructs the mounting adapter to annunciate a message indicating that a problem exists with the display of mission critical data on the uncertified display device, when the integrity checking module 204 determines that a problem does exist with the display of the mission critical data.

Figure 3:
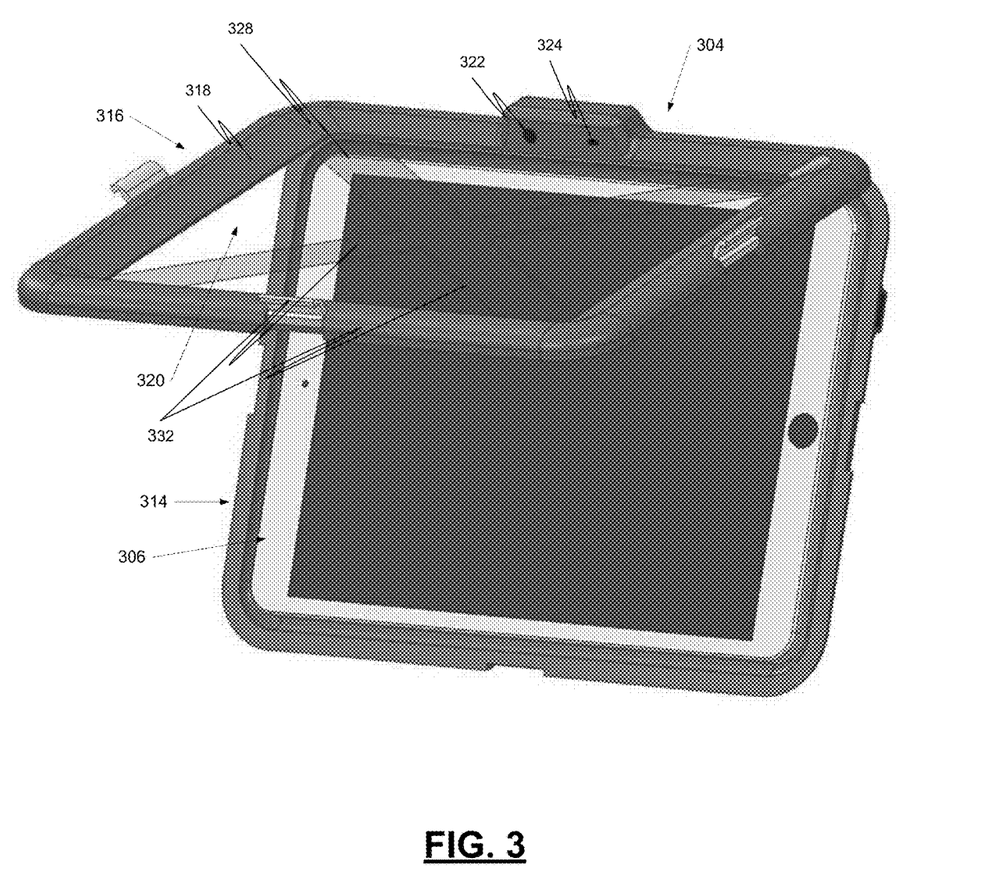
FIG. 3 is a simplified perspective view of an example PED mounting adapter, in accordance with various embodiments.

FIG. 3 is a simplified perspective view of an example mounting adapter 304. The example mounting adapter 304 incorporates a clamshell design configured for a PED/tablet 306 to be situated in a base 314 of the mounting adapter 304. The example mounting adapter 304 is also configured with a hinged lid 316 that may be closed over the top of the tablet 306 to fully encloses the tablet 306 within the mounting adapter 304. The base 314 accommodates the tablet 306 and may have threaded mounting bosses on its back to facilitate installation of the mounting adapter 304 in the aircraft. The example lid 316 includes a bezel 318, a surface 320 (e.g., an optically and capacitively transparent film), an imaging device 322 (e.g., a camera), and an actuation source 324 (e.g., optically emissive devices).

The example bezel 318 is attached to the base 314 by hinges (not shown) and closes around the tablet 306 to mechanically capture the tablet 306. The example bezel 318 also hosts the optically and capacitively transparent film 320, the imaging device 322, and the optically emissive devices 324.

The example optically and capacitively transparent film 320 is attached to the bezel 318 in a way that provides it physical contact with the tablet display when the lid 316 is closed to allow for normal touch-gesture control and display action of the tablet 306. Further, the example film 320 has an actuatable covering 328 (e.g., a special coating) applied which is optically active in the presence of an excitation source such as electrical voltage or current or coincident optical or near-optical radiation (such as ultraviolet light). Upon application of the appropriate excitation signal, the covering 328 changes state from normally optically transparent to optically emissive or opaque in a way that is easily visible to an operator in multiple lighting conditions encountered on a flight deck.

An imaging device 322, such as a small camera (e.g., a camera similar to one that might be included in a smart phone), is attached to the example bezel 318 and aimed in a manner to provide a view of the tablet display. More than one imaging device 322 may be required or a corrective lens (not shown) may be applied to compensate for the extremely oblique viewing angle the imaging device 322 may have with the tablet's display.

An actuation source 324, such as optically emissive devices (e.g., LEDs (light-emitting diodes) operating in a non-visible light band) may be located on the bezel and trained on the cover film 320 to illuminate the film's coating and activate its optical qualities. The LEDs, in some embodiments, may produce light in the UV-A band (320-400 nm) and, in some embodiments, may produce light at 385 nm for the color red. If the coating can be activated by an electrical signal, then the optically emissive devices 324 would not be needed in the bezel.

The example mounting adapter 304 further includes an adapter controller (not shown). The adapter controller is configured to transmit images from the display on the PED 306 to an application server (e.g., server 102 from FIG. 1), receive messages from the server indicating that a problem exists with the display of mission critical data on the tablet display (e.g. a loss of ICA), and cause the actuation source 324 to actuate the covering 328 to annunciate a message indicating that a problem exists with the display of mission critical data on the tablet display, when the server determines that a problem exists with the display of the mission critical data.

Figure 4:
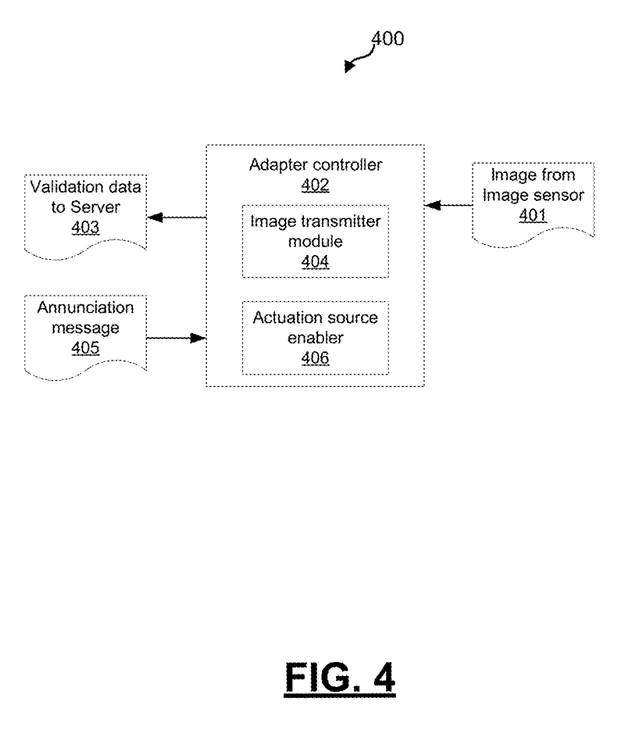
FIG. 4 is a block diagram depicting an example adapter controller in an example PED mounting adapter, in accordance with various embodiments.

FIG. 4 is a block diagram depicting an example adapter controller 402 in a mounting adapter 400. The example adapter controller includes an image transmitter module 404 and an actuation source enabler 406. The example adapter controller 402 includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller. In other embodiments, the adapter controller 114 may not include a processor.

The example image transmitter module 404 is configured to retrieve an image 401 of the PED display from an imaging sensor (e.g., imaging sensor from imaging device 322 from FIG. 3) and transmit the validation 403 (which includes image information from the PED display) to an application server (e.g., server 102 from FIG. 1). The example actuation source enabler 406 is configured to receive an annunciation message 405 from the server indicating that a problem exists with the display of mission critical data on the PED display (e.g. a loss of ICA), and cause an actuation source (e.g., actuation source 324 from FIG. 3) to actuate the covering 328 to annunciate a message indicating that a problem exists with the display of mission critical data on the PED display, when the server determines that a problem exists with the display of the mission critical data.

Referring again to FIGS. 1 and 3, the example system 100 may function as follows. An avionics application 108 such as a CDTI may execute on the server 102 while an avionics display application 110 executes on the tablet 106 or 306. The tablet 106 or 306 is enclosed in the mounting adapter 104 or 304 which is mounted on the flight deck in a suitable location (e.g., on the outboard side of the crew's seats). The mounting adapter 104 or 304 may be connected to the remote server 102 by several bus wires, such as a bi-directional data bus which allows for information exchanges between the tablet 106 or 306 and the server 102 (and perhaps supplies power to the tablet), a bus to carry video information from the imaging device 322 to the remote server 102, and a signal or power bus from the remote server 102 to the actuation source 324.

The example system 100 can allow uncertified displays such as PEDs/tablets 106 or 306 to display critical aeronautical information by performing two functions: ICA monitoring and providing crew annunciation of non-nominal ICA status.

ICA monitoring may be accomplished in two layers as follows. The avionics application 108 executing on the server will determine what information/images need to be displayed on the tablet 106 and will encode (e.g., using HTML5) and transmit that information to the avionics display application 110 executing on the tablet 106 or 306. In the first layer, prior to displaying any of this information, the avionics display application 110 will decode the information to be displayed and re-encode it in a dis-similar protocol and "echo back" the information to the remote server 102, which will compare the echo-back information with the information originally sent. Matching information will result in an "ack" (acknowledgement) from the server to the tablet while a mismatch would generate a "no-ack" and a crew annunciation. This first layer provides for monitoring the ICA to the avionics display application 110 but does not provide for monitoring the link between the avionics display application 110 and the physical display.

In the second layer, the system will monitor the actual information displayed on the screen via the imaging device 322 mounted on the bezel 318. As an example, monitoring may include monitoring all aspects of the display (color and location of every pixel) or using a sampling scheme where the probability of detecting loss of ICA is equivalent or better to the requirements of the Hazard Classification of the application. Thus, the monitoring rigor can be tailored to the criticality of the application. Sampling schemes could be further simplified by using specific patterns like QR codes which are displayed for a few milliseconds (faster than the time it takes for the human eye to perceive) on the display and may be customized for optimal recognizability by the imaging device 322 (e.g., a keystone shape). The codes could be randomly changed in content, location, and timing to add robustness to the sampling scheme. In any case, the optical information imaged by the imaging device 322 is sent back to the server 102 to enable the software application 108 to compare the image detected to what it expected to see based on what it sent to the tablet 106 or 306 for display. If a loss of ICA is detected, the server 102/application 108 would activate the appropriate annunciation.

If the server 102/application 108 determines that there has been a loss of ICA, it can activate an annunciation by asserting the appropriate electrical signal on the output bus to activate the coating on the cover film 320 of the tablet mounting adapter 104. As an example, the annunciation might simply put a red 'X' 332 over the display if a failure was detected. An 'X' character could be coated onto the cover film 320. Other more sophisticated (but fixed) imagery or text could (also or alternatively) be coated onto the cover film including one or more textual failure messages. In addition, a fail-condition may also result in the sending of display information to an alternate location such as a different tablet.

Figure 5:
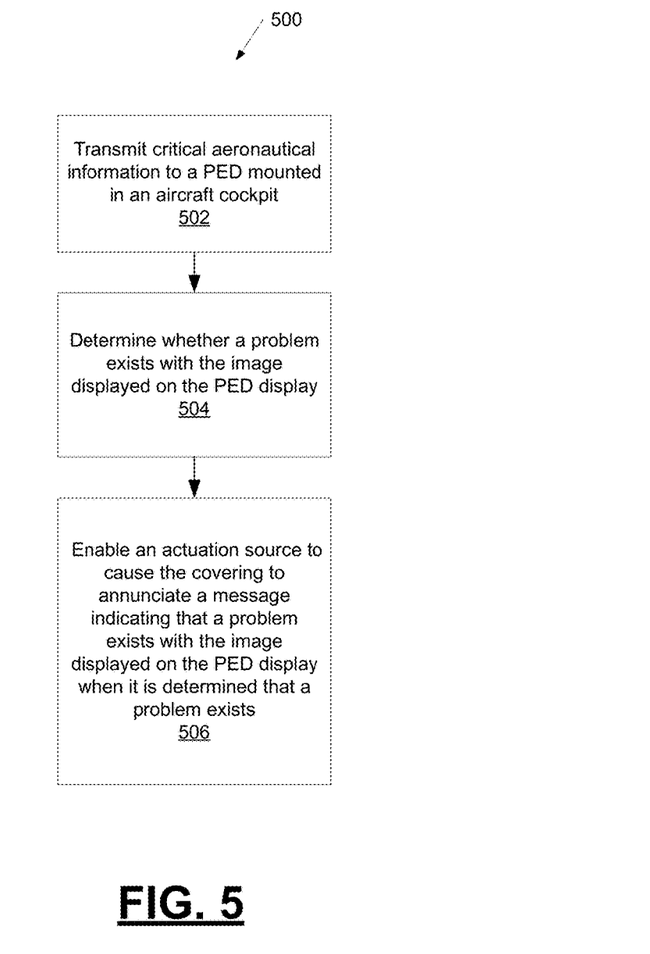
FIG. 5 is a process flow chart depicting a computer-implemented process in an aircraft for displaying critical aeronautical information on an aircraft display that is not certified for displaying critical aeronautical information, in accordance with various embodiments.

FIG. 5 is a process flow chart depicting an example computer-implemented process 500 in an aircraft for displaying critical aeronautical information on an aircraft display that is not certified for displaying critical aeronautical information. In various embodiments, the process can be scheduled to run based on one or more predetermined events, and/or can run continuously during operation of the aircraft.

The example process 500 includes transmitting critical aeronautical information to a PED mounted in an aircraft cockpit (operation 502). The critical aeronautical information is transmitted for display on a PED display of the PED, wherein the PED is not certified to display critical aeronautical information and wherein the PED display is overlaid with a surface having an actuatable covering on the surface.

The example process 500 includes determining whether a problem exists with the image displayed on the PED display (operation 504). Determining whether a problem exists with the image displayed on the PED display may include reviewing an image of the PED display generated by an imaging device to determine whether a problem exists with the image displayed on the PED display. Reviewing an image of the PED display generated by an imaging device may include reviewing the image of the PED display generated by an imaging device to assess the integrity, continuity, and availability (ICA) of the generated critical aeronautical information displayed on the PED display.

The example process 500 also includes enabling an actuation source to cause the actuatable covering on the surface that overlays the PED display to annunciate a message indicating that a problem exists with the image displayed on the PED display when that a problem exists (operation 506). Enabling the actuation source may include enabling the actuation source to actuate the covering to annunciate, on the surface overlaid on the PED display, a message indicating that a problem exists when the loss of ICA is detected. The annunciation may include a symbol such as an 'X' character or a textual message being displayed over the PED display.

The surface with an actuatable covering may include a film that is overlaid on the PED display wherein the film includes a coating that is optically active in the presence of an excitation source. The actuation source may include an excitation source that is configured to activate the optically active coating. The excitation source may include an optically emissive device. Enabling the actuation source to cause the covering to annunciate a message may include enabling the optically emissive device to cause the optically active coating to annunciate a message that indicates that a problem exists with the image displayed on the PED display.

Figure 6:
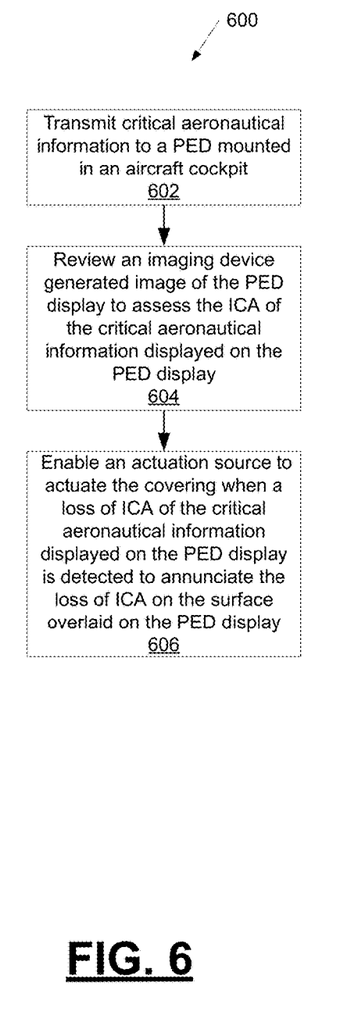
FIG. 6 is a process flow chart depicting another computer-implemented process in an aircraft for displaying critical aeronautical information on an aircraft display that is not certified for displaying critical aeronautical information, in accordance with various embodiments.

FIG. 6 is a process flow chart depicting another example computer-implemented process 600 in an aircraft for displaying critical aeronautical information on an aircraft display that is not certified for displaying critical aeronautical information. In various embodiments, the process can be scheduled to run based on one or more predetermined events, and/or can run continuously during operation of the aircraft.

The example process 600 includes transmitting critical aeronautical information to a PED mounted in an aircraft cockpit (operation 602). The critical aeronautical information is transmitted for display on a PED display of the PED, wherein the PED is not certified to display critical aeronautical information and wherein the PED display is overlaid with a surface having an actuatable covering on the surface.

The example process 600 further includes reviewing an image of the PED display generated by an imaging device to assess the ICA of the critical aeronautical information displayed on the PED display (operation 604). The example process 600 also includes enabling an actuation source to actuate the covering when a loss of ICA of the critical aeronautical information displayed on the PED display is detected to annunciate the loss of ICA on the surface overlaid on the PED display (operation 606).

In one embodiment, a display system configured for displaying critical aeronautical information on an aircraft display that is not certified for displaying critical aeronautical information is provided. The display system comprises a mounting adapter configured to mount, in an aircraft cockpit, a personal electronic device (PED) having a PED display wherein the PED is not certified to display critical aeronautical information. The mounting adapter further comprises a surface with an actuatable covering that is configured to be overlaid on the PED display and an actuation source configured to actuate the covering. The display system further comprises an application server comprising one or more processors and that is configured to execute one or more modules that generate critical aeronautical information, transmit the generated critical aeronautical information to the PED for display on the PED display, determine whether a problem exists with the image displayed on the PED display, and enable the actuation source to cause the covering to annunciate a message indicating that a problem exists with the image displayed on the PED display.

These aspects and other embodiments may include one or more of the following features. The mounting adapter may further comprise an imaging device configured to capture an image of the PED display; the mounting adapter may be further configured to transmit the image of the PED display to the application server; and the application server may be further configured to review the image from the PED display to determine whether a problem exists with the image displayed on the PED display. The imaging device may comprise a camera. The surface with an actuatable covering may comprise a film that is configured to be overlaid on the PED display wherein the film includes a coating that is optically active in the presence of an excitation source. The actuation source may comprise an excitation source that is configured to activate the optically active coating. The coating when activated may be configured to display a visible symbol that indicates that a problem exists with the image displayed on the PED display. The coating when activated may be configured to display the visible symbol in a color that indicates that a problem exists with the image displayed on the PED display. The color may be red and the symbol may be an X. The coating when activated may be configured to display text that indicates that a problem exists with the image displayed on the PED display. The excitation source may comprise an optically emissive device. The optically emissive device may comprise an LED (light-emitting diode) operating in a non-visible light band and configured to illuminate the coating on the film and activate optical qualities of the film. The excitation source may comprise an electrical source configured to deliver an electrical signal to the coating on the film to activate optical qualities of the film. The application server may be configured to review the image from the PED display to assess the integrity, continuity, and availability (ICA) of the generated critical aeronautical information displayed on the PED display. The application server may be further configured to enable the actuation source to actuate the covering when a loss of ICA of the generated critical aeronautical information displayed on the PED display is detected wherein the activation of the covering results in the annunciation of the loss of ICA on the surface overlaid on the PED display. The PED may comprise a general-purpose tablet computer or a smartphone.

In another embodiment, a computer-implemented method in an aircraft for displaying critical aeronautical information on an aircraft display that is not certified for displaying critical aeronautical information is provided. The method comprises transmitting, by a computing device in the aircraft, critical aeronautical information to a personal electronic device (PED) mounted in an aircraft cockpit for display on a PED display of the PED, wherein the PED is not certified to display critical aeronautical information and wherein the PED display is overlaid with a surface having an actuatable covering on the surface. The method further comprises determining, by the computing device, whether a problem exists with the image displayed on the PED display; and enabling, by the computing device, an actuation source to cause the covering to annunciate a message indicating that a problem exists with the image displayed on the PED display when it is determined that a problem exists.

These aspects and other embodiments may include one or more of the following features. Determining whether a problem exists with the image displayed on the PED display may comprise reviewing an imaging device generated image of the PED display to determine whether a problem exists with the image displayed on the PED display. Reviewing an imaging device generated image of the PED display may comprise reviewing the imaging device generated image of the PED display to assess the integrity, continuity, and availability (ICA) of the generated critical aeronautical information displayed on the PED display; and enabling the actuation source may comprise enabling the actuation source to actuate the covering when a loss of ICA of the critical aeronautical information displayed on the PED display is detected to annunciate the loss of ICA on the surface overlaid on the PED display. The surface with an actuatable covering may comprise a film configured to be overlaid on the PED display wherein the film includes a coating that is optically active in the presence of an excitation source; the actuation source may comprise an excitation source that is configured to activate the optically active coating; the excitation source may comprise an optically emissive device; and enabling an actuation source to cause the covering to annunciate a message may comprise enabling the optically emissive device to cause the optically active coating to annunciate a message that indicates that a problem exists with the image displayed on the PED display.

In another embodiment, a display system configured for displaying critical aeronautical information on an aircraft display that is not certified for displaying critical aeronautical information is disclosed. The display system comprises a mounting adapter configured to mount, in an aircraft cockpit, a personal electronic device (PED) having a PED display wherein the PED is not certified to display critical aeronautical information. The mounting adapter includes a film configured to be overlaid on the PED display and that includes a coating that is optically active in the presence of an excitation source. The mounting adapter further comprises an excitation source configured to activate the coating and a camera configured to take an image of the PED display. The display system further comprises an application server that is mounted in the aircraft and comprises one or more processors. The application server is configured to execute one or more modules that generate critical aeronautical information and is configured to transmit the generated critical aeronautical information to the PED for display on the PED display. The application server is configured to monitor the integrity, continuity, and availability (ICA) of the generated critical aeronautical information displayed on the PED display using the camera image and to enable the excitation source to activate the coating when a loss of ICA of the generated critical aeronautical information displayed on the PED display is detected. Activation of the coating results in the annunciation of the loss of ICA on the film overlaid on the PED display.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It is understood that various changes may be made in the function and arrangement of elements described in an exemplary embodiment without departing from the scope of the invention as set forth in the appended claims.

What is claimed is:

1. A display system configured for displaying critical aeronautical information on an aircraft display that is not certified for displaying critical aeronautical information, the display system comprising:
    a mounting adapter configured to mount, in an aircraft cockpit, a personal electronic device (PED) having a PED display wherein the PED is not certified to display critical aeronautical information, the mounting adapter comprising a surface with an actuatable covering that is configured to be overlaid on the PED display, wherein the surface with an actuatable covering is optically active in the presence of an excitation source, and an actuation source configured to actuate the covering; and
    an application server comprising one or more processors, the application server configured to execute one or more modules that generate critical aeronautical information, transmit the generated critical aeronautical information to the PED for display on the PED display, determine from an image of the PED display captured by an imaging device whether a problem exists with the image displayed on the PED display, and enable the actuation source to cause the covering to annunciate a message indicating that a problem exists with the image displayed on the PED display.

2. The system of claim 1, wherein:
    the mounting adapter further comprises the imaging device which is configured to capture an image of the PED display;
    the mounting adapter is further configured to transmit the image of the PED display to the application server; and
    the application server is further configured to review the image from the PED display to determine whether a problem exists with the image displayed on the PED display.

3. The system of claim 2, wherein the imaging device comprises a camera.

4. The system of claim 1, wherein the surface with an actuatable covering comprises a film configured to be overlaid on the PED display wherein the film includes a coating that is optically active in the presence of the excitation source.

5. The system of claim 4, wherein the actuation source comprises the excitation source that is configured to activate the optically active coating.

6. The system of claim 5, wherein the coating when activated is configured to display a visible symbol that indicates that a problem exists with the image displayed on the PED display.

7. The system of claim 6 wherein the coating when activated is configured to display the visible symbol in a color that indicates that a problem exists with the image displayed on the PED display.

8. The system of claim 7, wherein the color is red and the symbol is an X.

9. The system of claim 5, wherein the coating when activated is configured to display text that indicates that a problem exists with the image displayed on the PED display.

10. The system of claim 5, wherein the excitation source comprises an optically emissive device.

11. The system of claim 10 wherein the optically emissive device comprises an LED (light-emitting diode) operating in a non-visible light band and configured to illuminate the coating on the film and activate optical qualities of the film.

12. The system of claim 5, wherein the excitation source comprises an electrical source configured to deliver an electrical signal to the coating on the film to activate optical qualities of the film.

13. The system of claim 2, wherein the application server is configured to review the image from the PED display to assess the integrity, continuity, and availability (ICA) of the generated critical aeronautical information displayed on the PED display.

14. The system of claim 13, wherein the application server is further configured to enable the actuation source to actuate the covering when a loss of ICA of the generated critical aeronautical information displayed on the PED display is detected, the activation of the covering resulting in the annunciation of the loss of ICA on the surface overlaid on the PED display.

15. The system of claim 1, wherein the PED comprises a general-purpose tablet computer or a smartphone.

16. A computer-implemented method in an aircraft for displaying critical aeronautical information on an aircraft display that is not certified for displaying critical aeronautical information, the method comprising:
    transmitting, by a computing device in the aircraft, critical aeronautical information to a personal electronic device (PED) mounted in an aircraft cockpit for display on a PED display of the PED, wherein the PED is not certified to display critical aeronautical information, wherein the PED display is overlaid with a surface having an actuatable covering on the surface, and wherein the surface with the actuatable covering is optically active in the presence of an excitation source;

determining, from an image of the PED display captured by an imaging device by the computing device, whether a problem exists with the image displayed on the PED display; and enabling, by the computing device, an actuation source to cause the covering to annunciate a message indicating that a problem exists with the image displayed on the PED display when it is determined that a problem exists.

17. The method of claim 16, wherein determining whether a problem exists with the image displayed on the PED display comprises reviewing the imaging device generated image of the PED display to determine whether a problem exists with the image displayed on the PED display.

18. The method of claim 17, wherein:

reviewing the imaging device generated image of the PED display comprises reviewing the imaging device generated image of the PED display to assess the integrity, continuity, and availability (ICA) of the generated critical aeronautical information displayed on the PED display; and enabling the actuation source comprises enabling the actuation source to actuate the covering when a loss of ICA of the critical aeronautical information displayed on the PED display is detected to annunciate the loss of ICA on the surface overlaid on the PED display.

19. The method of claim 16, wherein:

the surface with an actuatable covering comprises a film configured to be overlaid on the PED display wherein the film includes a coating that is optically active in the presence of the excitation source;

the actuation source comprises the excitation source that is configured to activate the optically active coating;

the excitation source comprises an optically emissive device; and enabling an actuation source to cause the covering to annunciate a message comprises enabling the optically emissive device to cause the optically active coating to annunciate a message that indicates that a problem exists with the image displayed on the PED display.

20. A display system configured for displaying critical aeronautical information on an aircraft display that is not certified for displaying critical aeronautical information, the display system comprising:

a mounting adapter configured to mount, in an aircraft cockpit, a personal electronic device (PED) having a PED display wherein the PED is not certified to display critical aeronautical information, the mounting adapter including a film configured to be overlaid on the PED display and that includes a coating that is optically active in the presence of an excitation source, an excitation source configured to activate the coating, and a camera configured to take an image of the PED display; and an application server mounted in the aircraft and comprising one or more processors, the application server configured to execute one or more modules that generate critical aeronautical information and configured to transmit the generated critical aeronautical information to the PED for display on the PED display, the application server configured to monitor the integrity, continuity, and availability (ICA) of the generated critical aeronautical information displayed on the PED display using the camera image and to enable the excitation source to activate the coating when a loss of ICA of the generated critical aeronautical information displayed on the PED display is detected, the activation of the coating resulting in the annunciation of the loss of ICA on the film overlaid on the PED display.

* * * * *